May 27, 1941.                H. W. LEVERENZ                2,243,828
LUMINESCENT SCREEN
Filed Oct. 25, 1938
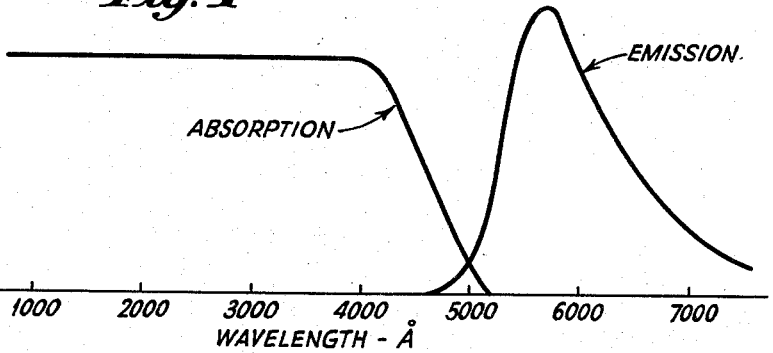
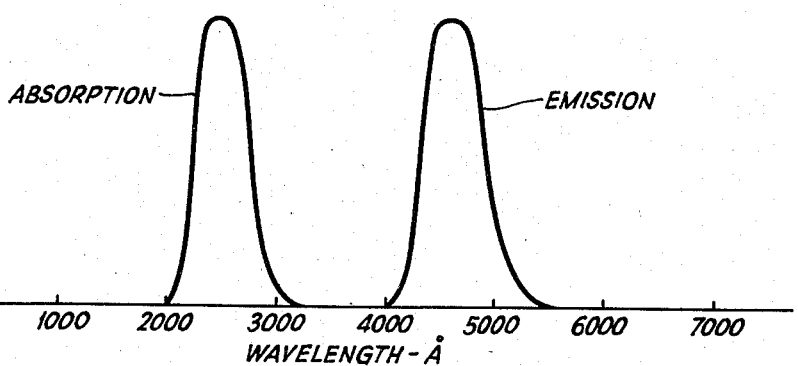
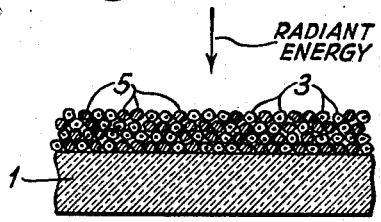
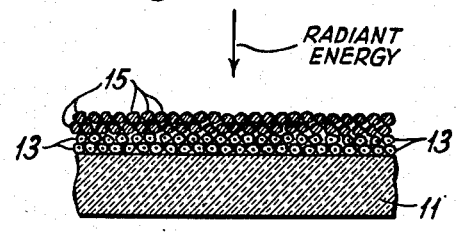
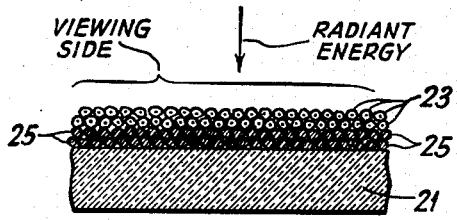
INVENTOR.
HUMBOLDT W. LEVERENZ
BY
ATTORNEY.

Patented May 27, 1941

2,243,828

UNITED STATES PATENT OFFICE 2,243,828

LUMINESCENT SCREEN

Humboldt W. Leverenz, Collingswood, N. J., assignor to Radio Corporation of America, a corporation of Delaware Application October 25, 1938, Serial No. 236,909

17 Claims. (Cl. 250—80)

This invention relates to luminescent screens and more particularly, to luminescent screens comprising two or more different luminescent materials, one or more of which materials appreciably absorbs visible light, said screens being particularly useful for use in cathode ray tubes, fluorescent tubes used in signs and X-ray screens, in which it is desired to produce white light, and to improve the efficiency and color of such screens and emitted light.

Luminescent screens, in addition to being used for luminous sign tubings and for combined incandescent and fluorescent lights, have also been used in cathode ray tubes such as "Kinescopes" for television purposes. Under such conditions, it is very desirable to have a luminescent screen, which when bombarded by cathode rays which emit white light. As is well known, what is commonly called "white" light actually may be tinged with any shade of the spectrum running from blue through green, or yellow to red. While such screens are an improvement over the well known and customary green willemite or yellow willemite used, nevertheless there is need for a screen which shall be substantially white and untinged by any other hue. To obtain such screens it is customary to mix two or more phosphors or luminescent materials which have different color emission properties in such proportion as to produce a substantially white light. An ideal white light would be represented by equal energy output at any visible wave length, that is a spectral distribution which would be a straight line parallel to the abscissa representing energy.

In actual practice, however, it is customary for the human eye to associate blue-white, such as daylight, with high illumination or brilliancy levels, and yellow-white, such as an incandescent lamp produces, with low illumination or brilliancy, and individual preference may vary considerably as to the exact kind of white desired. Accordingly, it is well to point out at this point that white light can be produced from the mixing of two or more phosphors having complementary colors, since it is well known that white light can be produced by adding two saturated spectral complementaries, as has been pointed out by Sinden in the Journal of the Optical Society of America, and Review of Scientific Instruments, vol. 7, page 1123 (1923). I have found from my experiments that the most efficient binary chromatic white emitting sources comprise the complementaries having violet blue light of wave length 4590 Å., and green-yellow light of a wave length at 5720 Å. These two complementaries should be mono-chromatic, but actually in practice phosphors may be used which are peaked at these values, even though they are not strictly mono-chromatic, and still obtain substantially pure white light. An example of such phosphors is silver activated zinc sulphide for the violet blue, and zinc cadmium sulphide for the green-yellow. The usual practice in making screens containing two or more phosphors has simply been to grind or otherwise mix the phosphors together, and then deposit these upon a support surface to form a heterogeneous layer. However, some luminescent materials absorb an appreciable amount of visible light in spectral regions other than that of their own emission region, so that mixed particle screens using such absorbing materials has the disadvantage that the screen's efficiency is seriously decreased by the light loss in the absorbing particles. Since this absorbed energy is obtained from the other phosphor or phosphors mixed with the absorbing phosphor, there results a change in color, as well as a reduction of efficiency. Accordingly, to overcome this disadvantage, my invention makes use of the method and structure of building the screens in separate layers in which the least light absorbing particles are deposited on the side of the screen to be viewed. By this method and type of construction, the absorbing phosphor has substantially no opportunity of diminishing the amount of light emitted from the non-absorbing phosphor, with the result that the efficiency of conversion into light energy is improved on the order of 25%, while at the same time the spectral emission remains unchanged and so provides a truly white light.

Accordingly, it is one of the objects of my invention to provide an improved luminescent screen emitting substantially white light.

Another object of my invention is to provide a new method of fabricating luminescent screens so as to increase the efficiency and improve the spectral emission of such screens.

A further object of my invention is to provide a luminescent screen in which two or more phosphors are combined in separate layers, one of which phosphors absorbs visible light in spectral regions other than its own emission region, and the other phosphor absorbing substantially no visible light, said non-absorbing phosphor being positioned on the viewed side of the screen.

Other objects and advantages of my invention will become apparent upon reading the detailed description below taken together with the drawing.

In the drawing,

Figs. 1 and 2 show graphically typical light emitting and light absorbing spectral characteristics of a visible light absorbing phosphor and a non-visible light absorbing phosphor respectively;

Fig. 3 shows schematically for purposes of explanation of the invention, the type of screen hitherto provided where a mixture of phosphors were used;

Fig. 4 shows one embodiment of my invention in which the relatively non-absorbing particles of phosphor are positioned on the side remote from the excitation but adjacent to the viewer; while Fig. 5 shows a modification of the embodiment shown in Fig. 4 in which the screen is to be viewed from the same side as that upon which the excitation energy falls.

Turning to Fig. 1, I have shown the light emission and light absorbing spectral characteristics of zinc cadmium sulphide as an example of a visible light absorbing phosphor, while in Fig. 2 I have shown the light absorbing and emission spectra of a non-visible light absorbing phosphor, such as zinc sulphide activated by silver. It will be noted that the zinc cadmium sulphide has its peaked emission at roughly 5700 Å, while the silver activated zinc sulphide has a peaker emission at approximately 4600 Å. Thus it is clear that a mixture of these two materials will provide substantially a white light screen since the peaked values of emission fall very closely on the binary chromatic complementaries mentioned above. However, it is to be noted further that the zinc cadmium sulphide shown in Fig. 1 absorbs light between approximately 4200 and 5200 Å, which lies in part within the visible spectrum. Consequently, the zinc cadmium sulphide will absorb light emitted from the zinc sulphide since a portion of the emission spectrum of the zinc sulphide lies in the absorbing region of the zinc cadmium sulphide. On the other hand, as will be noted in Fig. 2, the zinc sulphide absorbs only in the ultra-violet region, which region not being visible to the eye, does not reduce the efficiency or the hue of the resultant light. Thus to mix zinc cadmium sulphide and silver activated zinc sulphide together to provide a luminescent screen in the manner known to the prior art, would result in producing a screen whose emitted light was yellow instead of white, due to the fact that the zinc cadmium sulphide absorbs a certain amount of blue light to give overall yellow appearance to the emitted light.

In accordance with my invention, therefore, I make use of the fact that one of the materials does not absorb light in the visible region, while the other phosphor does by supporting upon a screen surface the relatively non-absorbing particles as a layer, and depositing upon that layer a layer of relatively absorbing particles, as shown in Fig. 4.

In Fig. 4 the support surface 11 supports the non-absorbing particles 13 and thereupon is deposited a separate layer of light absorbing material 15. Appropriate designations are shown to indicate the face upon which the excitation energy falls, as well as the side from which the screen is to be viewed. Similarly in Fig. 5 the support surface 21 has deposited upon it a layer of light absorbing material 23 and a layer of non-absorbing particles 25 deposited upon the layer 23.

It will be noticed by reference to the figures that Fig. 3, which shows the support surface 1 having heterogeneous mixture of light absorbing particles 5 and the non-light absorbing particles 3, illustrates the screens known in the prior art. In this structure, light absorbing particles are positioned between the viewing position and non-absorbing luminescent material with the resultant reduction in intensity of illumination and change in color of the screen from pure white. Screens as in Figs. 4 and 5 provide a more efficient transmission of light and invariable white light spectral emission in view of the fact that there are no night absorbing particles positioned intermediate the non-light absorbing particles and the observer's position.

It will be understood that each layer actually may be several particles thick, but for simplicity in explaining the invention, I have shown the layers only two particles thick. It will be noted that in Fig. 4 the screen is to be viewed on the side from which the relatively non-absorbing particles are in contact with the support surface. In Fig. 5, however, where the screen is to be viewed by the same side upon which excitation falls, then the absorbing particles are in contact with the support surface and the relatively non-absorbing particles are supported thereupon. Examples of relatively high light absorbing luminescent materials are the zinc cadmium sulphides with or without activators, such as silver or copper, zinc sulphide activated by copper, and zinc cadmium manganese sulphides. Certain tungstates and silicates are also strongly light absorbing. For the relatively non-absorbing visible light luminescent materials silver activated zinc sulphide, pure zinc sulphide, manganese activated zinc silicates, and zinc beryllium silicates may be used, as well as certain tungstates.

In the actual preparation of the screen, any of the well known methods may be used. That is to say by either spraying the luminescent material with or without a binder and if the screen is to be viewed from the support surface side, then the non-absorbing luminescent material is first deposited. If a binder is used, following the spraying the tube is generally heated to drive off the binder, leaving a layer of non-absorbing luminescent materials in contact with the surface. Thereafter, the light absorbing luminescent material is sprayed upon the deposited layer and again, if a binder has been used in the spraying, the tube is again heated to drive off the binder as is well known in the art.

Conversely, if the screen is to be observed from the side upon which excitation energy falls, then the light absorbing phosphor is first deposited in a similar fashion pointed out above, and thereafter the non-absorbing layer is deposited. Again, as is well known in the art, the particles may be settled out on the screen. Where this is done generally the finely comminuted particles are stirred up in an appropriate liquid to provide suspension of the particles. The produced suspension is thereafter poured into the container and allowed to stand very quietly. The particles gradually settle out of suspension, providing a uniformly highly tenacious layer in contact with the glass surface, and when the layer is sufficiently thick, the tube is gently tilted to pour off the suspension solution without, however, disturbing the deposited layer, and again to provide a screen of the type shown in Fig. 4, the suspension first used would have the non-absorbing luminescent material, such as zinc beryllium silicate, for example. After a layer of this material is settled out and the excess suspension decanted, the tube is then either heated gently to drive off the excess moisture, or alternatively, may be left standing until by evaporation the excess liquid disappears. Thereafter, the second suspension, containing the light absorbing particles, is poured in very gently, care being taken not to disturb the already deposited layer and after the layer of light absorbing particles has settled out, the second portion is decanted gently, and thereafter the tube dried either by gentle heat or by evaporation by letting the tube stand.

In many applications, it is desirable to use a phosphor, such as one of the silicates, containing luminescent materials such as synthetic willemite (manganese activated zinc ortho-silicate) or a zinc beryllium silicate. These materials strongly adhere to a glass surface, and thereafter the less adherent materials, such as sulphides or materials having larger particle size may be deposited, since the layer of the silicates being relatively rough compared to that of a glass surface, aids in holding these particles to form a more robust screen.

It will be appreciated, of course, that this type of structure is also particularly useful, in addition to the example pointed out above of cathode ray tubes, in preparation of tubes used in making signs or in fluorescent type lamps, as well as preparation of screens for excitation by X-rays, such as the well known fluoroscopes.

It will thus be appreciated that by depositing phosphors in separate layers with the last light absorbing layer positioned on the viewing side of the screen, there results a screen of increased efficiency and better color properties than those screens known in the prior art in which the phosphors were mixed intimately and deposited in heterogeneous layers.

Many modifications and changes may be made in the disclosures hereinabove described without departing from the spirit and scope of the present invention and it is to be understood that such modifications as would suggest themselves to those skilled in the art may be made and used insofar as they fall fairly within the scope of the hereinafter appended claims.

Having described by invention, what I claim is:

1. In a luminescent screen wherein is provided a plurality of phosphors having different visible light absorbing characteristics, the method of fabrication which includes the step of depositing each of the plurality of phosphors in separate layers in contact with and upon each other, the order of deposition being in accordance with the magnitude of visible light absorption of the phosphors and independently of particle size, degree of energy absorption and fluorescent sensitivity of the phosphors.

2. In a luminescent screen wherein is provided a plurality of phosphors having different visible light absorbing characteristics and wherein the principal amount of light from said phosphor is liberated in the same direction as the direction of the excited energy impinging on said phosphors, the method of fabrication which includes the step of depositing each of the plurality of phosphors in separate layers in contact with and upon each other, the order of deposition being in accordance with increasing magnitude of visible light absorption of the phosphors.

3. In a luminescent screen wherein is provided a plurality of phosphors having different visible light absorbing characteristics and wherein the principal amount of light from said phosphor is liberated in the opposite direction than the direction of the excited energy impinging on said phosphors, the method of fabrication which includes the step of depositing each of the plurality of phosphors in separate layers in contact with and upon each other, the order of deposition being in accordance with decreasing magnitude of visible light absorption of the phosphors.

4. The method of preparing a luminescent screen adapted to be viewed from the opposite direction than the direction of the exciting energy impinging upon said screen which comprises the steps of depositing in the order named to provide maximum visible light emission efficiency in the direction that the screen is to be viewed a layer of a phosphor having substantially no visible light absorption upon a support surface, and depositing a layer of a phosphor having appreciable visible light absorption upon the first named layer.

5. The method of preparing a luminescent screen adapted to be viewed from the same direction as the direction of the exciting energy impinging upon said screen which comprises the steps of depositing in the order named to provide maximum visible light emission efficiency in the direction that the screen is to be viewed a layer of a phosphor having appreciable visible light absorption upon a support surface, and depositing a layer of a phosphor having substantially no visible light absorption upon the first named layer.

6. The method of preparing a luminescent screen adapted to be viewed from the opposite direction than the direction of the exciting energy impinging upon said screen and wherein the principal amount of light from said phosphor is liberated in the same direction as the direction of the excited energy impinging on said phosphors which comprises the steps of depositing in the order named to provide maximum visible light emission efficiency in the direction that the screen is to be viewed a layer of a phosphor having substantially no visible light absorption and a maximum spectral emission at a predetermined wave length upon a support surface, and depositing a layer of a phosphor having appreciable visible light absorption and a maximum spectral emission at a wave length complementary to the wave length of the first named layer.

7. The method of preparing a luminescent screen adapted to be viewed from the same direction as the direction of the exciting energy impinging upon said screen and wherein the principal amount of light from said phosphor is liberated in the opposite direction than the direction of the excited energy impinging on said phosphors which comprises the steps of depositing in the order named to provide maximum visible light emission efficiency in the direction that the screen is to be viewed a layer of a phosphor having appreciable visible light absorption and a maximum spectral emission at a predetermined wave length upon a support surface, and depositing a layer of a phosphor having substantially no visible light absorption and a maximum spectral emission at a wave length complementary to the predetermined wave length upon the first named layer.

8. A fluorescent screen comprising a support surface, a layer of a phosphor having appreciable visible light absorption in contact with the support surface, and a layer of a phosphor having substantially no visible light absorption positioned upon the first named layer.

9. A fluorescent screen comprising a support surface, a layer of a phosphor having substantially no visible light absorption in contact with the support surface, and a layer of a phosphor having appreciable visible light absorption positioned upon the first named layer.

10. A fluorescent screen comprising a support surface, a layer of a phosphor having appreciable visible light absorption and a maximum spectral emission at a predetermined wave length in contact with the support surface, and a layer of a phosphor having substantially no visible light absorption and a maximum spectral emission at a wave length complementary to the predetermined wave length of the first named phosphor deposited upon the first named layer.

11. A fluorescent screen comprising a support surface, a layer of a phosphor having substantially no visible light absorption and a maximum spectral emission at a predetermined wave length in contact with the support surface, and a layer of a phosphor having appreciable visible light absorption and a maximum spectral emission at a wave length complementary to the predetermined wave length of the first named phosphor deposited upon the first named layer.

12. A luminescent screen comprising a support surface, a layer of silver activated zinc sulphide deposited upon said support surface, and a layer of zinc cadmium sulphide deposited upon the layer of silver activated zinc sulphide.

13. A luminescent screen comprising a support surface, a layer of zinc cadmium sulphide deposited upon the support surface, and a layer of silver activated zinc sulphide deposited upon the layer of zinc cadmium sulphide.

14. A white light luminescent screen comprising a support surface, a layer of luminescent orange-yellow emitting sulphide having high light absorption to blue light deposited upon the support surface, and a layer of luminescent blue emitting sulphide positioned upon said first named layer.

15. A luminescent screen comprising a support surface and a plurality of successive layers of individual phosphors, each phosphor having a different visible light absorption characteristic, said successive layers being supported from said surface, the order of the successive layers being in accordance with the progression of the magnitude of the light absorption characteristic of the phosphors.

16. A luminescent screen comprising a support surface and a plurality of layers of individual phosphors, each phosphor having a different visible light absorption characteristic, said layers being supported from said surface, the order of the layers being in accordance with increasing magnitude of the light absorption characteristic of the phosphors.

17. A luminescent screen comprising a support surface and a plurality of layers of individual phosphors, each phosphor having a different visible light absorption characteristic, said layers being supported from said surface, the order of the layers being in accordance with decreasing magnitude of the light absorption characteristic of the phosphors.

HUMBOLDT W. LEVERENZ.